(12) United States Patent
Taha et al.

(10) Patent No.: US 12,019,048 B2
(45) Date of Patent: Jun. 25, 2024

(54) CEMENTITIOUS SENSORS WITH ACOUSTIC STOPBANDS USING CARBON NANOTUBES

(71) Applicant: STC Rainforest Innovations, Albuquerque, NM (US)

(72) Inventors: Mahmoud Reda Taha, Albuquerque, NM (US); Sang M. Han, Albuquerque, NM (US); John Stormont, Albuquerque, NM (US); Thomas Dewers, Albuquerque, NM (US); Laura L Pyrak-Nolte, Albuquerque, NM (US); Shreya Vemuganti, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 570 days.

(21) Appl. No.: 17/270,836

(22) PCT Filed: Aug. 23, 2019

(86) PCT No.: PCT/US2019/048030
§ 371 (c)(1),
(2) Date: Feb. 23, 2021

(87) PCT Pub. No.: WO2020/041771
PCT Pub. Date: Feb. 27, 2020

(65) Prior Publication Data
US 2021/0190728 A1 Jun. 24, 2021

Related U.S. Application Data

(60) Provisional application No. 62/722,746, filed on Aug. 24, 2018.

(51) Int. Cl.
*G01N 29/04* (2006.01)
*G01N 29/12* (2006.01)
*G01N 29/24* (2006.01)

(52) U.S. Cl.
CPC ....... *G01N 29/043* (2013.01); *G01N 29/2475* (2013.01); *G01N 2291/0232* (2013.01); *G01N 2291/0289* (2013.01)

(58) Field of Classification Search
CPC ...... G01N 29/00; G01N 29/04; G01N 29/043; G01N 29/12; G01N 29/36; G01N 29/42;
(Continued)

(56) References Cited

U.S. PATENT DOCUMENTS 8,865,107 B2 10/2014 Hersam et al.
10,247,707 B1 * 4/2019 Pollock ................ G01N 33/383
(Continued)

FOREIGN PATENT DOCUMENTS

| EP | 3150998 A1 | 4/2017 |
|---|---|---|
| KR | 101551446 B1 | 9/2015 |
| SU | 894571 A1 | 12/1981 |

OTHER PUBLICATIONS

Federal Institute of Industrial Property; International Search Report & Written Opinion for PCT/US2019/048030; Dec. 5, 2019; 7 pages; Moscow; RU.

*Primary Examiner* — Nguyen Q. Ha
(74) *Attorney, Agent, or Firm* — Keith Vogt, Ltd.; Keith A. Vogt (57) ABSTRACT

A sensor having one or more stopbands and method of using the same for detecting damage, cracking and debonding in a cement structure comprising a cementitious material and a plurality of periodic structures located in the cementitious material.

21 Claims, 5 Drawing Sheets

(58) Field of Classification Search
CPC ....... G01N 29/2475; G01N 2291/0232; G01N 2291/0289
See application file for complete search history.

(56) References Cited

U.S. PATENT DOCUMENTS

| | | | |
|---|---|---|---|
| 10,254,424 B1* | 4/2019 | Pollock | E21B 43/267 |
| 2018/0202990 A1* | 7/2018 | Von Herzen | G01N 29/343 |

* cited by examiner

CEMENTITIOUS SENSORS WITH ACOUSTIC STOPBANDS USING CARBON NANOTUBES

RELATED APPLICATIONS

This application is a 371 National Phase of PCT/US2019/048030, filed on Aug. 23, 2021, which claims priority to U.S. provisional application Ser. No. 62/722,746 filed Aug. 24, 2018, both of which are incorporated herein in its entirety.

BACKGROUND OF THE INVENTION

Cementitious materials are used in wellbores (e.g., for oil and gas production) to stabilize the steel casing used in wellbore operations and limit fluid movement between different sub-surface strata. Wellbore cement is subjected to changing stresses induced due to well operations, pressure testing and hydraulic fracturing. Development and propagation of cracks in wellbore cement may lead to leakage along the wellbore and raises concerns about well integrity.

Monitoring wellbore cement is difficult due to its inaccessibility and co-location with steel. Ultrasonic measurements from within the wellbore have been used to evaluate the cement system; however, a high degree of attenuation in cement-based materials renders ultrasonic monitoring of limited value.

Acoustic bandgap (ABG) materials, essentially analogous of photonic crystals in an acoustic sense, are periodic structures that do not allow acoustic wave propagation in a certain frequency range. These structures are usually manufactured or modeled with a polymer or metal matrix with inclusions such as tin, aluminum, gold, steel and have several applications in sound filters, transducer design, and acoustic mirroring. One study has demonstrated the possible use of photonic crystals as surface sensors for submicron damage detection. Other research has explained the use of polymer acoustic bandgap matrix with aluminum inclusions to detect damage on the surface of aerospace composites. Others have developed a cement-based strain sensor using carbon black due to its high piezoresistive properties. It was shown that cement-based composites demonstrate effective strain-sensing capabilities when multi-walled carbon nanotubes are incorporated.

Bandgap calculations and optimization can be performed using the Finite Difference Time Domain (FDTD) method as wells as the Plane Wave Expansion (PWE) method. More recently, COMSOL Multiphysics package has become a powerful tool in the simulation and optimization of materials with bandgaps. By utilizing the COMSOL's Floquet-Bloch periodicity conditions effectively, engineering the bandgaps can be computationally attainable.

BRIEF SUMMARY OF THE INVENTION

In one embodiment, the present invention provides cementitious sensors capable of exhibiting stopbands in the acoustic spectra using carbon nanotubes.

In other embodiments, the present invention provides sensors made of a cementitious material with wide acoustic stopbands for use in monitoring cement and concrete in varying service environments.

In other embodiments, the present invention provides sensors made of a cementitious material with acoustic stopbands for damage detection.

In other embodiments, the present invention provides sensors made of a periodic composite structure with cement and high modulus nanomaterials.

In other embodiments, the present invention provides sensors made of a periodic composite structure with cement and high modulus nanomaterials that are modeled to analyze the properties of the composite structure to design one or more stopbands and the width of the stopbands.

In other embodiments, the present invention provides a system and method for monitoring a structure made in part from cement that uses cementitious sensors capable of exhibiting stopbands in the acoustic spectra using carbon nanotubes.

In other embodiments, the present invention provides a cementitious sensor capable of exhibiting stopbands in a desired or predetermined acoustic spectra.

In other embodiments, the present invention provides a cementitious sensor capable of exhibiting stopbands in a desired or predetermined acoustic spectra using carbon nanotubes.

In other embodiments, the present invention provides a sensor made of a cementitious material with acoustic stopbands for damage, cracking and debonding detection.

In other embodiments, the present invention provides a sensor made of a cementitious material with wide acoustic stopbands for use in monitoring cement and concrete in varying service environments.

In other embodiments, the present invention provides a sensor made of a periodic composite structure with cementitious matrix (including but not limited to Portland cement, calcium silicate hydrate, type G cement, microfine cement, foam cement, geopolymer cement, polymer modified cement, other cements) and high modulus nanomaterials (including but not limited to carbon nanotubes, aluminum nanoparticles, graphene nanoparticles, metallic nanoparticles, other high modulus nanoparticles).

In other embodiments, the present invention provides a sensor made of a periodic composite structure with cement and high modulus nanomaterials that are modeled to analyze the properties of the composite structure to design one or more stopbands and the width of the stopbands.

In other embodiments, the present invention provides a sensor made of a periodic composite structure with cement and high modulus nanomaterials to produce stopband behavior because of the high contrast in acoustic impedance between the cementitious materials and carbon nanotubes (CNTs).

In other embodiments, the present invention provides an acoustic stopband cement sensor made of MWCNTs and cementitious materials.

In other embodiments, the present invention provides an acoustic stopband cement sensor made of MWCNTs and cementitious materials having one or more stopbands.

In other embodiments, the present invention provides an acoustic stopband cement sensor made of MWCNTs and cementitious materials having one or more stopbands wherein the number of the stopbands are a function of the filling fraction.

In other embodiments, the present invention provides an acoustic stopband cement sensor made of MWCNTs and cementitious materials having one or more stopbands and bandgaps wherein the number of the stopbands are a function of the filling fraction, and the width of bandgaps is affected by the filling fraction.

In other embodiments, the present invention provides an acoustic stopband cement sensor made of MWCNTs and cementitious materials wherein a maximum stopband width is obtained for a filling fraction of 0.6 at the micrometer scale.

In other embodiments, the present invention provides an acoustic stopband cement sensor made of MWCNTs and cementitious materials wherein the sensor is configured to create stopbands in one or more desired acoustic spectra.

In other embodiments, the present invention provides an acoustic stopband cement sensor made of MWCNTs and cementitious materials wherein the filling fractions range between 0.25 and 0.8 to produce stopbands.

In other embodiments, the present invention provides an acoustic stopband cement sensor made of MWCNTs and cementitious materials wherein periodic inclusions of MWCNTs produce a wide stopband width in the range of 0.5-5 MHz.

In other embodiments, the present invention provides a sensor comprising one or more periodic structures, such as MWCNTs, distributed in a cementitious matrix host.

In other embodiments, the present invention provides a sensor of claim having different shapes configured to maximize the acoustic contrast and to enable blending of the cement sensor into the surrounding cement environment.

In other embodiments, the present invention provides a system and method of using the sensors to detect changes in the area surrounding the sensor including cracks, debonding, etc.

In other embodiments, the present invention provides a system with 3-dimensional sensors that can be added to cementitious materials to detect changes in the area surrounding the sensor including cracks, debonding In other embodiments, the present invention provides a system and method of using the sensors in harsh service conditions such as oil wells and nuclear waste repositories in deep boreholes.

In other embodiments, the present invention provides a system and method to fabricate the sensors using a low interfacial bond and flexible silicone mold developed from a 3D printed metal mask.

In other embodiments, the present invention provides a system and method wherein MWCNTs are deposited into prefabricated cylindrical holes using ultrasonic spray coating technology.

In other embodiments, the present invention provides acoustic cement sensors produced using 3D-printed nano-materials It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Phononic crystals are composite media that are periodic structures consisting of inclusions in a host material. They are also called elastic bandgap materials because of their typical features of not allowing the propagation of mechanical waves of specific frequencies and for vibration isolation in a certain frequency range. The elastic contrast in periodic arrangement essentially creates a gap in the transmission spectra which are often referred to as 'stopbands' or 'bandgaps.' The width of a bandgap depends on the contrast in physical and material properties of host and inclusion material. Material characteristics (such as the speed of sound through a material ($c_1$), which depends on the density ($\rho$) and modulus (K) of the material), represented by Equation 1, may be significantly different between the host and inclusion material. Equation 2 describes the material's impedance (Z). Impedance contrast between the host and inclusion material is the most important criterion to maximize the bandgap.

$$c_1 = \sqrt{\frac{K}{\rho}} \quad \text{Eq (1)}$$

$$Z = \rho c_1 \quad \text{Eq (2)}$$

Bandgap analysis of elastic materials may be performed by first defining a periodic unit cell which is a repetitive element in an infinite periodic structure. In addition to a contrast between the properties of the host and inclusion, the portion of the cross-sectional area of the host to be occupied by the inclusion is also a factor in the resulting bandgap. The portion occupied by the inclusion in the unit cell is called the filling fraction (FF), and a sufficient filling factor fraction is required to create bandgaps.

Periodic structures can also be manufactured from inclusions with circular cross-sections in two dimensional solid/solid acoustic bandgap materials. The assumption here is that wave propagation is in the plane perpendicular to the vertical axis of the inclusions. When the cell is built up of circular inclusions of radius 'r,' inside the host matrix of edge length 'α' the filling fraction can be described by Equation 3.

$$FF = \frac{\pi r^2}{a^2} \quad \text{Eq (3)}$$

Simulation of elastic wave propagation in a periodic unit cell is based on Floquet-Bloch wave theory. The vibrational modes of the unit cell are given by Equation 4.

$$u_{dst} = u_{src} e^{-ik_F(r_{dst}-r_{src})} \quad \text{Eq (4)}$$

where u is the displacement vector with respect to the destination (dst) and source (src), r is the position vector with respect to the destination and source, and $k_F$ is the Floquet wave vector. The phase velocity of the Bloch wave in the direction of wave vector $k_F$ is related to the wave vector, $k_F$, with the circular frequency, ω, described by Equation 5.

$$c_{Bloch} = \frac{\omega}{|k_F|} \quad \text{Eq (5)}$$

Figure 1A:
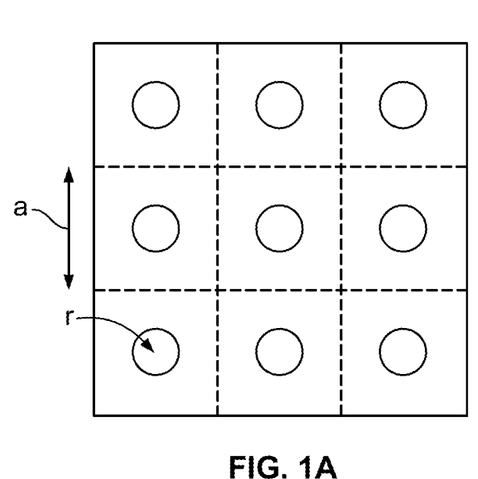
FIG. 1A illustrates multiple individual repetitive elements forming a periodic structure for 2D periodic structures.
Figure 1B:
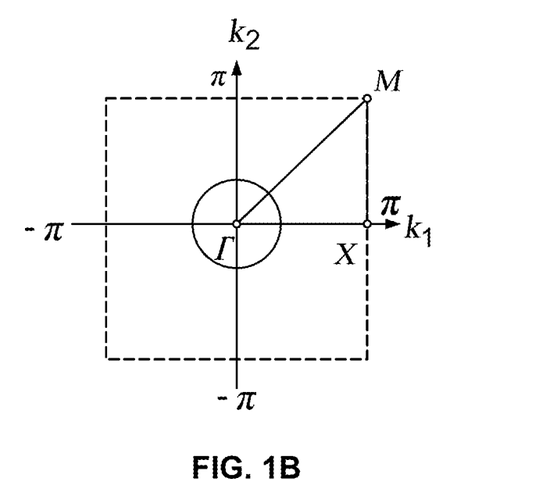
FIG. 1B illustrates an individual cell indicating the irreducible Brillouin zone for 2D periodic structures for an embodiment of the present invention.

Though Equation 4 can be solved for any value of the wave vector, investigating the first Brillouin zone is sufficient because of the periodic nature of the band structure. The first Brillouin zone ends at a value of $k_1$ given by Equation 6. This is illustrated in FIGS. 1A and 1B.

$$k_1 = \frac{\pi}{a} \quad \text{Eq (6)}$$

The investigation is limited to just triangle 100 in cell 110 defined by boundaries wave Γ→X, X→M and M→Γ, where Γ, X, and M are wave vectors because of the square symmetry of the cell.

Multiwalled carbon nanotubes (MWCNTs) are known to have a very high Young's modulus compared with other nanomaterials typically used in cement such as nanoclay, nanosilica, and nanoalumina. In addition, MWCNTs have proven to be hyperechogenic materials in the past. This indicates their ability to reflect bright echoes when subjected to ultrasonic waves. Compared with Graphene Oxide (GO) and Single-walled CNTs, pristine and functionalized MWCNTs have displayed much higher echogenicity. Furthermore, studies have shown that MWCNTs can be well-dispersed in the cement matrix using sonication techniques. Mechanical and elastic properties of cement incorporating well-dispersed MWCNTs are typically higher than those of neat cement. MWCNTs-cement nanocomposites have also shown piezoresistive properties that enable electrical resistance changes under pressure. Considering all of the above factors, MWCNTs may be used in a preferred embodiment of the present invention as inclusion materials for cementitious materials to create an acoustic stopband cement sensor.

Example cementitious materials include: Portland cement, nanomodified cement, polymer modified cement, oil well cement, microfine cement, geopolymer cement, foam cement, synthetic cement, synthetic Calcium Silicate Hydrate (CSH), fiber reinforced cement, etc. . . . The material characteristics of both cement and MWCNTs are defined by their respective Young's modulus, E, Poisson's ratio, ϑ and density, ρ. For acoustic simulations, the following material characteristics listed in Table 1 were used.

TABLE 1

| Material | Density (ρ) $\frac{kg}{m^3}$ | Modulus (E) GPa | Impedance (Z) MRayl | Poisson ratio (ϑ) |
|---|---|---|---|---|
| Material characteristics used in acoustic simulation | | | | |
| Cement | 1500-2000 | 2.0-4.5 GPa | 2.6 | 0.25 |
| MWCNTs | 2100 | 60-200 GPa | 17.3 | 0.33 |

The Young's modulus of hardened cement paste, with 0.5 water/cement ratio, obtained from nanoindentation tests may range from 2.0 to 4.8 GPa after three days curing and 6.5 GPa to 7.5 GPa after seven days curing. The Young's modulus of MWCNTs are highly variable; measured in the direction of MWCNTs longitudinal axis, the modulus ranges from 0.4 and 4.15 TPa. The Young's modulus of MWCNTs may be affected with the degree of order within the tube walls. It was also assumed that MWCNTs would agglomerate and form a cluster with relatively low elastic modulus compared to that of individual MWCNTs. Furthermore, it was assumed that fresh cement may infiltrate the MWCNTs microstructure during fabrication, such that the inclusions represent a mixture of MWCNTs and hardened cement nanocomposite with a relatively low modulus of 60-200 GPa compared with the individual MWCNTs modulus of 0.4-4.15 TPa.

Figure 2:
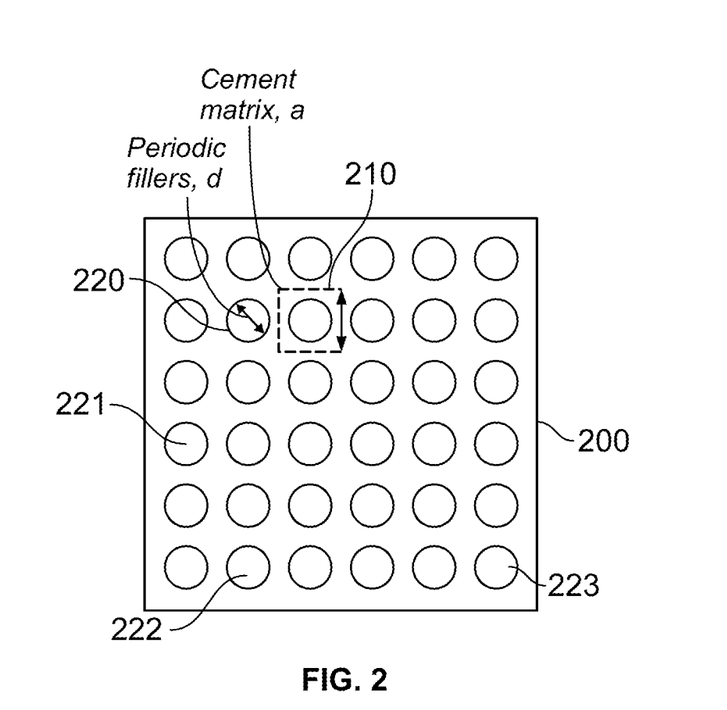
FIG. 2 is a cement sensor with acoustic stopbands showing periodic fillers in a cementitious matrix for an embodiment of the present invention.
Figure 3A:
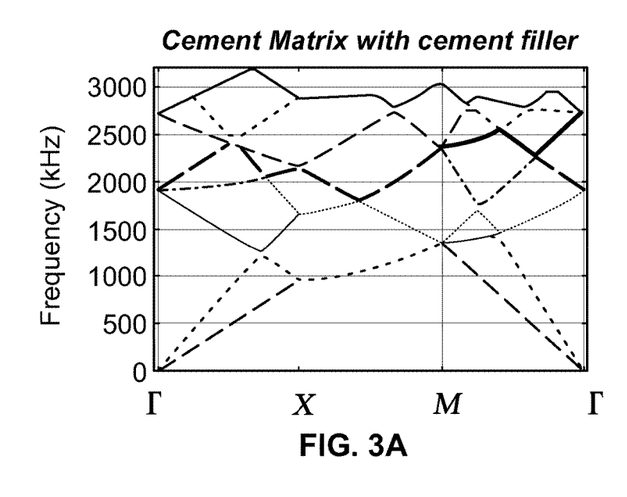
FIG. 3A illustrates band structures of cement matrix with cement filler for an embodiment of the present invention.
Figure 3B:
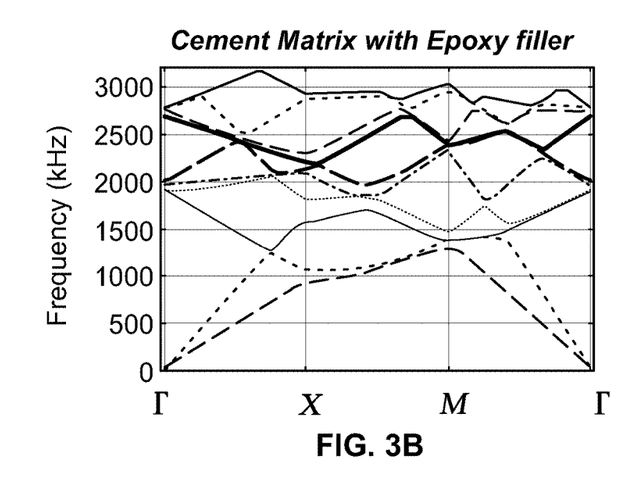
FIG. 3B illustrates band structures of cement matrix with epoxy filler for an embodiment of the present invention.
Figure 3C:
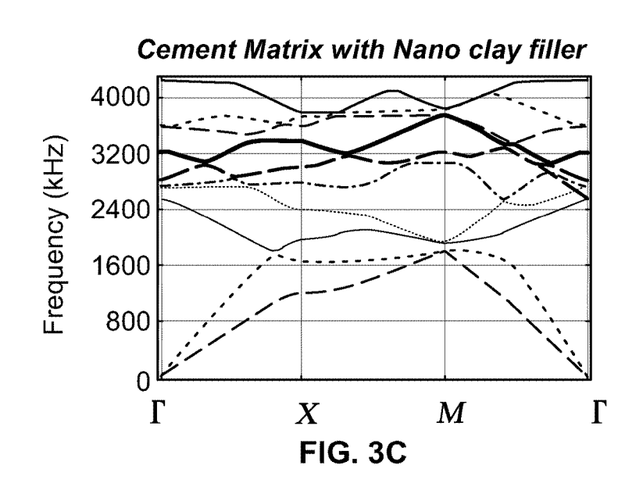
FIG. 3C illustrates band structures of cement matrix with Nano clay filler for an embodiment of the present invention.
Figure 3D:
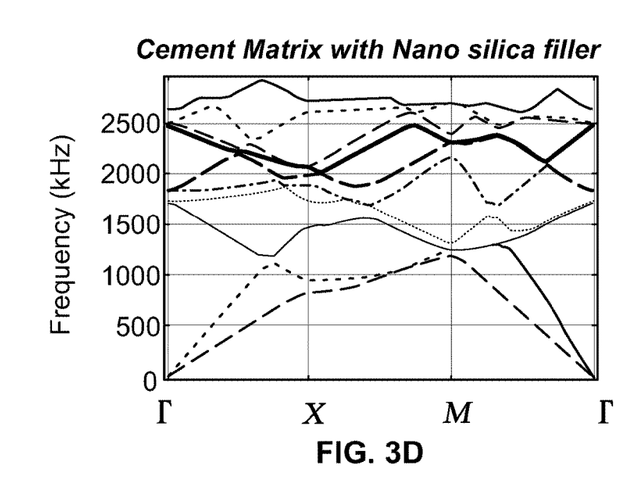
FIG. 3D illustrates band structures of cement matrix with Nano silica filler for an embodiment of the present invention.

The Floquet-Bloch wave theory is modeled in COMSOL using the periodic boundary condition called "Floquet periodicity". To solve the complex Eigenvalue problem for determining Bloch waves, an eigenfrequency analysis, as described by equation 2, was performed. Along with the eigenfrequency analysis, a parametric study was also performed sweeping through the parameter, k, which enables sampling of the wave vector space along specific directions to obtain information about several vibration modes of the periodic unit cell. As shown in FIG. 2, cement sensor 200 includes a cement matrix 210 with a plurality of periodic fillers 220-223.

Typical fillers (cement, epoxy, nanoclay, and nanosilica) were examined first in a cement matrix to determine the potential for creating an acoustic stopband using these fillers. Due to the low impedance mismatch between the host (cement) and inclusions (typical fillers), no acoustic stopbands were observed in the simulation results for these structures as shown in FIGS. 3A-3D.

Figure 4:
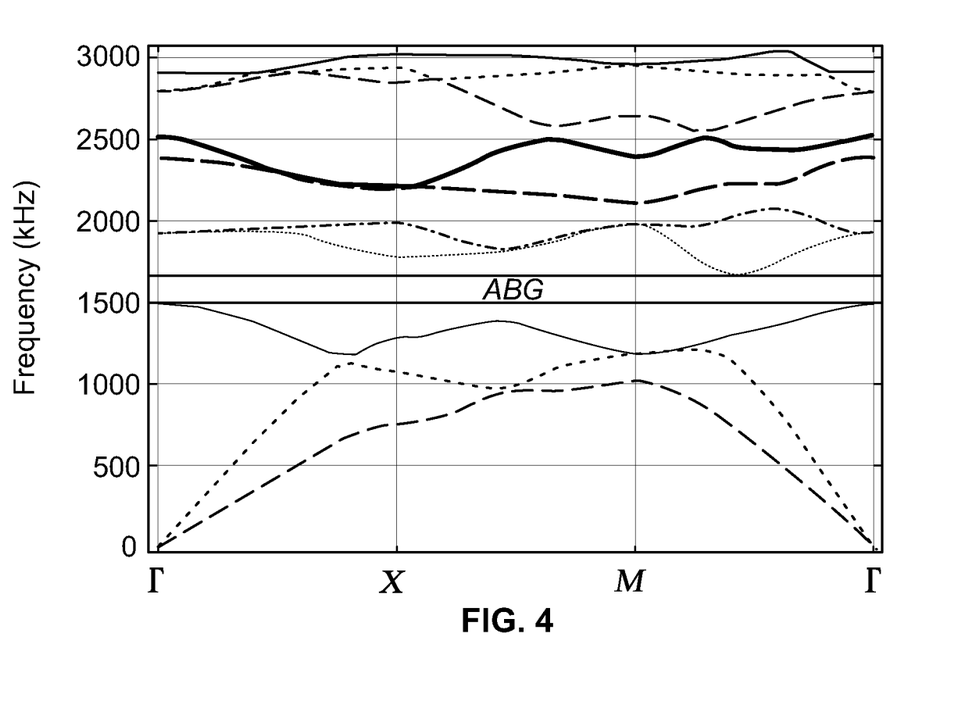
FIG. 4 illustrates band structure at a filling fraction of 0.35 at a micron scale for an embodiment of the present invention.
Figure 5:
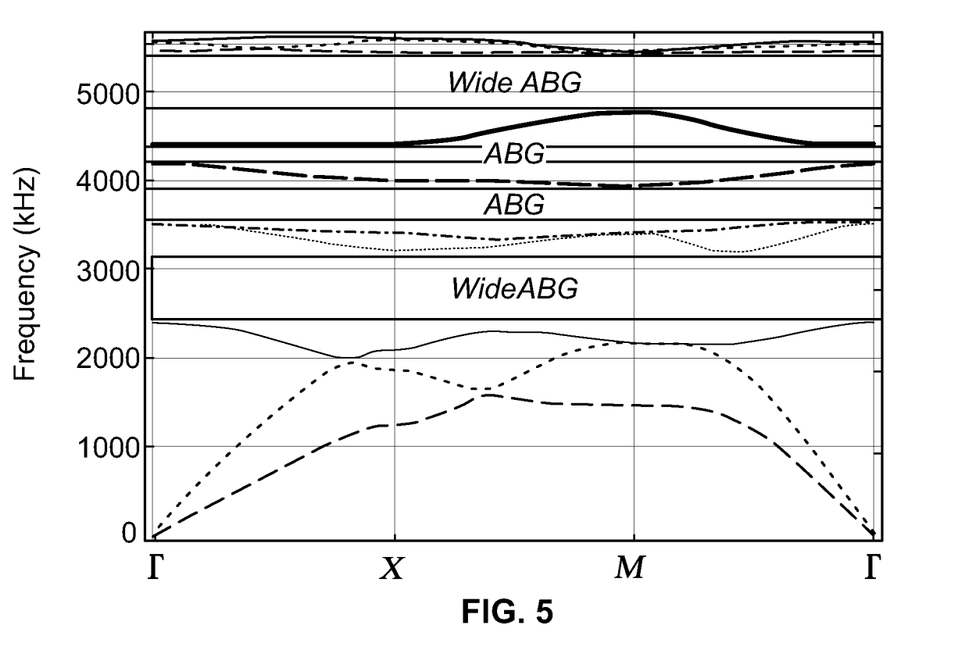
FIG. 5 illustrates band structure at a filling fraction of 0.6 at a micron scale for an embodiment of the present invention.
Figure 6:
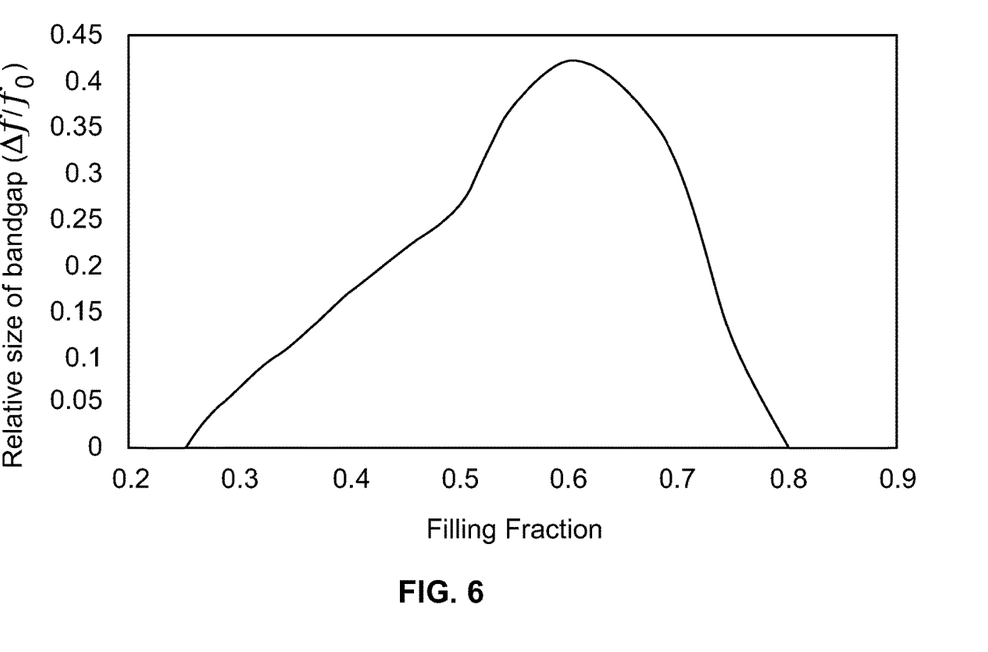
FIG. 6 illustrates relative bandgaps widths obtained for a range of filling fractions for an embodiment of the present invention.

On the other hand, when MWCNTs are implemented as fillers in the cement matrix, several acoustic stopbands are observed. The width and number of the stopbands are a function of the filling fraction. The width of bandgaps is affected by the filling fractions and most often observed for low filling fractions of 0.3-0.4 at the micrometer scale as shown in FIG. 4. The maximum stopband width is obtained for a filling fraction of 0.6 at the micrometer scale as shown in FIG. 5. At a low filling fraction of 0.25 and a high filling fraction of 0.8, the bandgap disappears as shown in FIG. 6.

As shown above, sensors made of cementitious materials and MWCNTs are capable of exhibiting stopband behavior in their acoustic transmission spectra. The above simulation and findings create several unique possibilities in the field of monitoring of cement and concrete where acoustic signals can be filtered or completely prohibited or changes in them can be observed and analyzed. The above analysis demonstrates that incorporating MWCNTs as periodic filler materials in a cementitious matrix may create stopbands in one or more desired acoustic spectra.

Filling fractions ranging between 0.25 and 0.8 may be used to produce desired or predetermined stopbands. Cement with periodic inclusions of MWCNTs can exhibit a reasonably wide stopband width in the range of 0.5-5 MHz. It is possible to engineer a sensor with stopbands in frequency ranges predefined a priori.

In other embodiments, the sensors of the present invention may be used to detect changes in areas surrounding the sensor including cracks, debonding, etc. In still other aspects, the embodiments of the present invention are of significant value in areas where other methods of sensing (e.g. fiber optics) are not possible due to harsh service conditions such as oil wells and nuclear waste repositories in deep boreholes.

In yet other embodiments, the present invention provides sensors that may include one or more periodic structures, such as MWCNTs, distributed in a cementitious matrix host. The periodic structure may be fabricated using a low interfacial bond and flexible silicone mold developed from a 3D printed metal mask. MWCNTs are deposited into prefabricated cylindrical holes using ultrasonic spray coating technology.

Figures 7A, 7B:
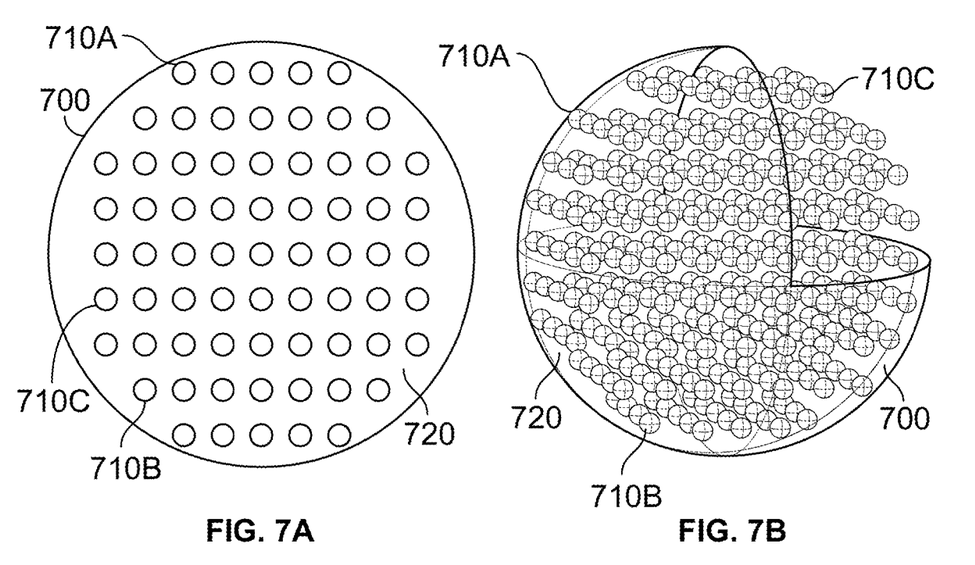
FIG. 7A illustrates cement sensors with acoustic stopbands in two dimensions for an embodiment of the present invention.
FIG. 7B illustrates cement sensors with acoustic stopbands in three dimensions for an embodiment of the present invention.

Examples of the proposed sensor with acoustic stopbands are shown schematically in FIG. 7A for a two-dimensional view and in FIG. 7B for a three-dimensional view. As shown in FIGS. 7A and 7B, in a preferred embodiment, sensor 700 is comprised of one or more periodic structures 710A-710C, such as MWCNTs, distributed in a cementitious matrix host 720. The periodic structures may have different shapes aimed at maximizing the acoustic contrast and enable blending of the cement sensor into the surrounding cement environment. The sensors can also have different shapes made using 3D-printed carbon nanotubes and configured to maximize the acoustic contrast and to enable blending of the cement sensor into the surrounding cement environment.

A low interfacial bond and flexible silicone mold developed from a 3D printed metal mask may be used to create the sensors of the present invention. The MWCNTs used with the present invention may be deposited into prefabricated cylindrical holes using ultrasonic spray coating technology.

3D-printed carbon nanotubes structures can be deposited in a periodic fashion in a cementitious matrix to produce the required sensor geometry, predetermined sensor geometry or sensor array having a predetermined pattern.

Figure 8:
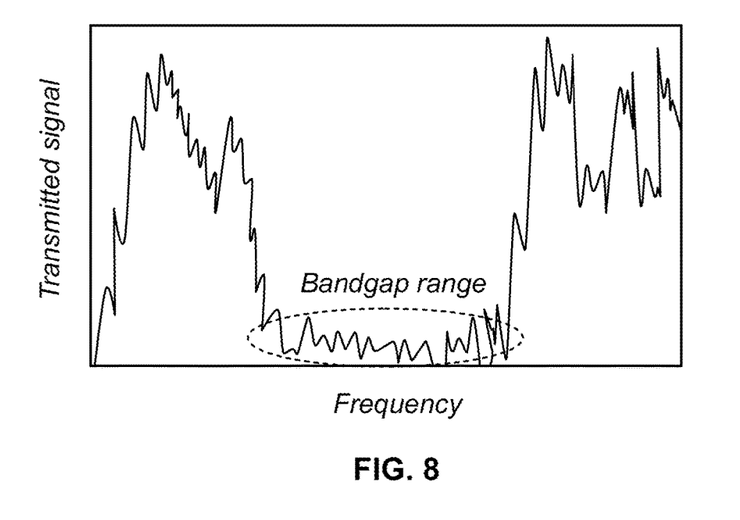
FIG. 8 is a plot of transmitted signal versus frequencies sweep range in cement acoustic stopband sensors for an embodiment of the present invention.

The effect of effective moduli on the width of the bandgap, as well as the significance of periodicity disturbance on sensor behavior relate those changes in the stopbands and/or frequency transmission profiles are shown in FIG. 8 as well as to detect damage in the surrounding environment around the cement sensor.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A sensor for detecting damage, cracking and debonding in a cement structure comprising:
   a cementitious material;
   a plurality of periodic structures located in said cementitious material; and said periodic structures having an acoustic stopband.

2. The sensor of claim 1 wherein said periodic structures have more than one acoustic stopband.

3. The sensor of claim 1 wherein said cementitious material is made of Portland cement, calcium silicate hydrate, type G cement, microfine cement, foam cement, geopolymer cement, polymer modified cement, and combinations thereof.

4. The sensor of claim 1 wherein said plurality of periodic structures are made of high modulus nanomaterials including carbon nanotubes, aluminum nanoparticles, graphene nanoparticles, metallic nanoparticles, other high modulus nanoparticles.

5. The sensor of claim 1 wherein said plurality of periodic structures are multi-walled carbon nanotubes.

6. The sensor of claim 5 wherein a filling fraction of said multi-walled carbon nanotubes in said cementitious material has a range of between 0.25 and 0.8.

7. The sensor of claim 6 wherein said multi-walled carbon nanotubes produce a wide stopband width in the range of 0.5-5 MHz.

8. The sensor of claim 6 wherein the filling fraction of said multi-walled carbon nanotubes in said cementitious material is 0.6 at the micrometer scale.

9. The sensor of claim 1 wherein said plurality of periodic structures are carbon nanotubes (CNTs).

10. The sensor of claim 5 having said multi-walled carbon nanotubes in said cementitious material at a plurality of filling fractions to produce a different stopband for each filling fraction.

11. The sensor of claim 1 wherein said periodic structures have different shapes configured to maximize the acoustic contrast and to enable blending of the sensor into the cement structure.

12. A method for detecting damage, cracking and debonding in a cement structure comprising the following steps:
   locating in the structure a plurality of sensors;
   said sensors comprised of a cementitious material, a plurality of periodic structures located in said cementitious material, and said periodic structures having an acoustic stopband;
   generating acoustic signals in said structure and analyzing said signals for detecting damage, cracking and debonding in the structure; and wherein said periodic structures is deposited predetermined sensor geometry or sensor array having a predetermined pattern.

13. The method of claim 12 wherein said periodic structures have more than one acoustic stopband.

14. The method of claim 12 wherein said cementitious material is made of Portland cement, calcium silicate hydrate, type G cement, microfine cement, foam cement, geopolymer cement, polymer modified cement, and combinations thereof.

15. The method of claim 12 wherein said plurality of periodic structures are made of high modulus nanomaterials including carbon nanotubes, aluminum nanoparticles, graphene nanoparticles, metallic nanoparticles, other high modulus nanoparticles.

16. The method of claim 12 wherein said plurality of periodic structures are multi-walled carbon nanotubes.

17. The method of claim 16 wherein a filling fraction of said multi-walled carbon nanotubes in said cementitious material has a range of between 0.25 and 0.8.

18. The method of claim 17 said multi-walled carbon nanotubes produce a wide stopband width in the range of 0.5-5 MHz.

19. The method of claim 17 wherein the filling fraction of said multi-walled carbon nanotubes in said cementitious material is 0.6 at the micrometer scale.

20. The method of claim 16 having said multi-walled carbon nanotubes in said cementitious material at a plurality of filling fractions to produce a different stopband for each filling fraction.

21. The method of claim 12 wherein said periodic structures have different shapes configured to maximize the acoustic contrast and to enable blending of the sensor into the cement structure.

* * * * *